May 9, 1939.  W. B. JONES  2,157,705
WEIGHING SCALE INDICATOR
Filed Oct. 22, 1937
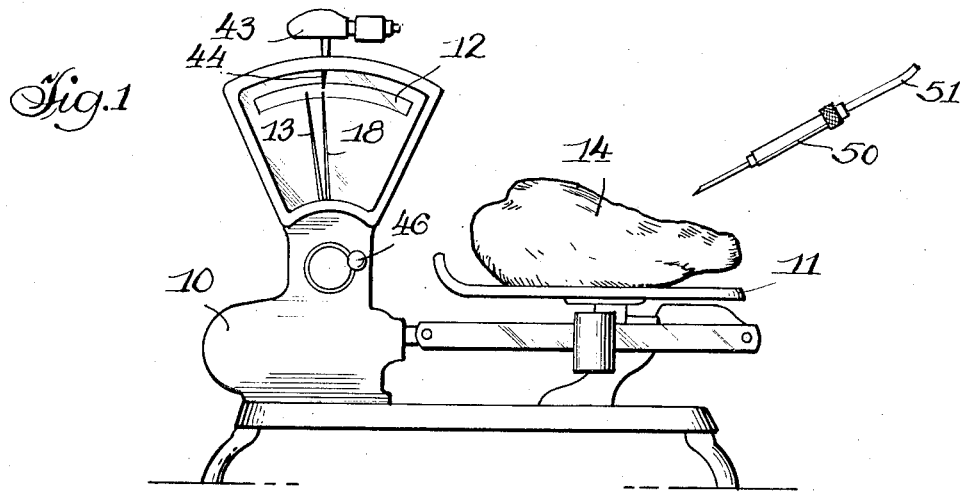
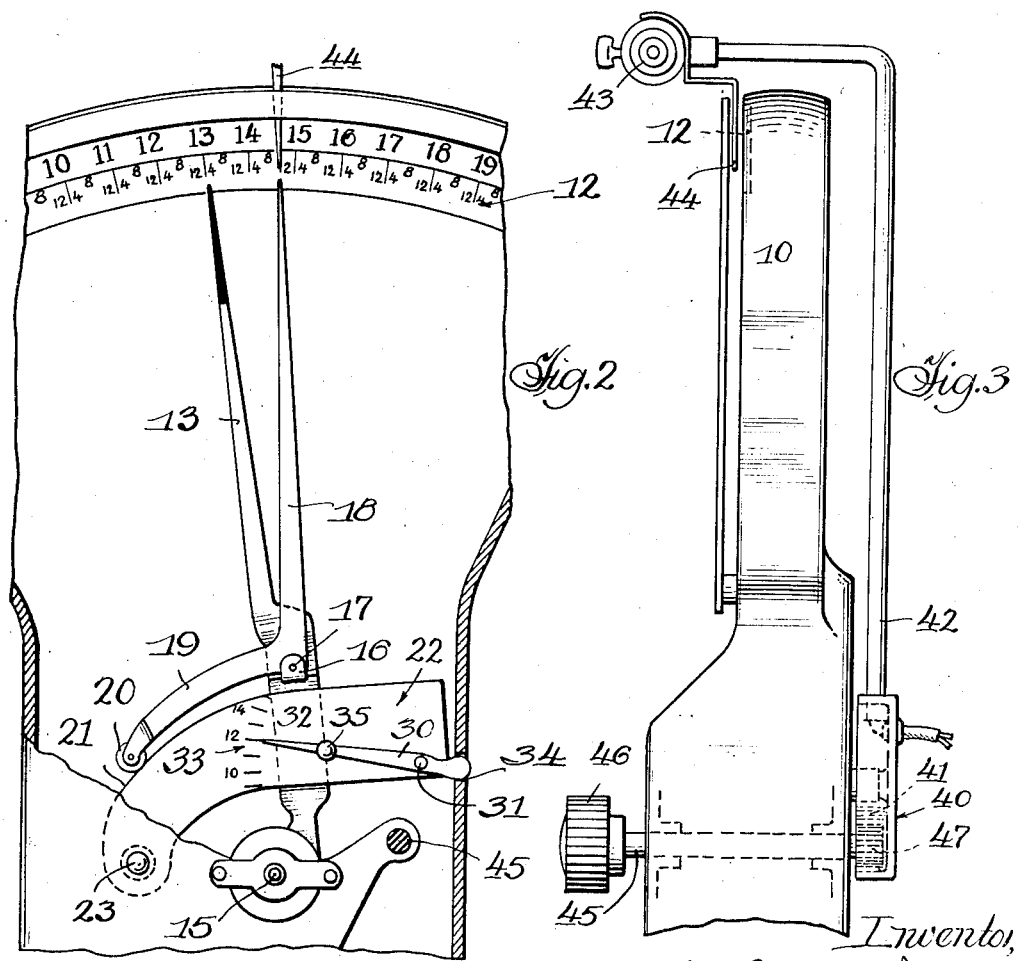
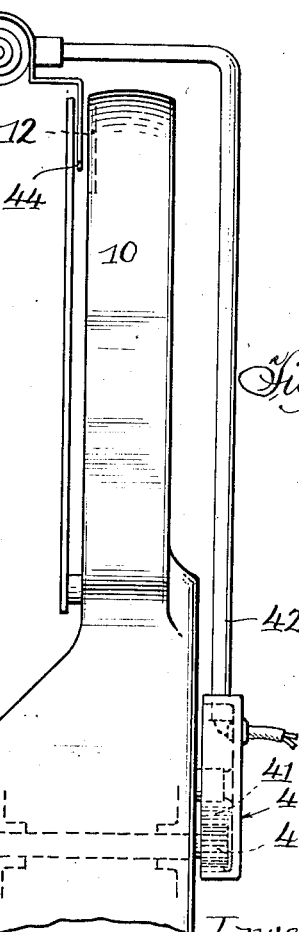
Inventor,
W. Bartlett Jones.

Patented May 9, 1939

2,157,705

UNITED STATES PATENT OFFICE 2,157,705

WEIGHING SCALE INDICATOR

W. Bartlett Jones, Chicago, Ill., assignor to The Griffith Laboratories, Inc., Chicago, Ill., a corporation of Illinois Application October 22, 1937, Serial No. 170,306

8 Claims. (Cl. 116—129)

The present invention relates to weighing devices and in particular to one having relatively movable indicator and scale to visually mark the weight of an object.

The invention relates to a special mechanism which causes another weight to be indicated as well as the true weight, and the second indicated weight may be a predetermined percentage more or less than the original weight of the object. For example, the invention may be used where an original object weighed, is to be increased in weight by a given percentage by adding material to it. The operations may be carried out simply and without calculation by using the present device. The device has particular application to pickling hams by injecting pickle solution into a weighed ham on a scale pan. The device is adapted to indicate the increasing weight and to indicate the point where the addition of pickle is to be stopped.

The primary object of the invention is to provide an indicating scale with an auxiliary indicating device which moves with the true-weight indicator to register a different weight having a predetermined ratio to the true weight.

Another object of the invention is to provide a device for changing the said predetermined ratio.

Another object of the invention is to provide a registering device for marking the point which the auxiliary device indicates when the true-weight device indicates the initial weight of the article, the weight of which is to be altered by a predetermined percentage.

Other and ancillary objects and advantages of the invention will be made known by the following description and explanation of the preferred embodiment of the invention shown in the accompanying drawing, in which:

Fig. 1 is a general view of a conventional weighing device embodying the invention, and showing a ham on the scale pan.

Fig. 2 is a detailed view of the mechanism showing the relation between the two registering needles and the ratio device between them with the means for varying the ratio.

Fig. 3 is an enlarged view of the scale of Fig. 1 looking toward the left of Fig. 1, showing the construction of the manually operated pointer.

In the drawing a conventional weighing device is shown having a casing 10, a pan 11, a scale 12, and a true-weight needle 13. On the pan is indicated a 13 lb. ham 14. The needle 13 is pivoted in the casing at the point 15 with any suitable weighing mechanism to actuate it (not shown). On the needle 13 there is a bracket 16 carrying a pivot 17 on which turns a secondary needle 18, also registering on the scale 12. An arm 19 is carried by the secondary needle 18, and this arm presents a cam-riding part in the form of a roller 20. The arm in the form shown acts as a weight to move the secondary needle counter-clockwise in the figures on its pivot. The roller 20 rests on a cam-edge 21 of a cam-device 22. This is shown as a plate mounted at its left on a pivot 23 in the casing. The cam is mounted for frictionally holding any set position. The other end of the cam may be raised and lowered to adjust the position of cam-edge 21 so as to determine the position of the secondary needle 18 with respect to the true-weight needle.

The cam is designed to maintain a constant ratio between the weights registered by the two needles for any set position of the cam. As shown, one cam is suitable within a desired range of ratios, but it is to be understood that different cams may be used for fixed ratios, or that any cam may vary the ratio for different parts of the scale where such change may be desired. For the purposes of pickling hams to increase the original weight by a given percentage, a fixed ratio is desired, as given by the cam shown.

The cam 22 is provided with a device to move it which also registers or indicates the ratio for which it acts. The particular means for doing this comprises a lever 30 pivoted at 31 to the cam, having a pointer-end 32 which registers on dial 33 impressed on the cam. The other end of the lever 30 rests on an edge 34 of the casing to provide a fulcrum. A handle 35 on the pointer-arm provides a convenient means to move the lever, thus moving the cam.

On the rear of the casing behind the pivot 15 for the true weight needle is a revolving drum 40 with an internal gear 41. The drum carries an arm 42 upwardly over the top of the scale on which is mounted, for convenience, an electric light 43 to illuminate the scale. It also carries a pointer 44 registering on the scale. From the front of the casing a rotary shaft 45 projects, with a manual turning knob 46. The shaft extends through the casing into the drum and there terminates in a pinion 47, meshing with gear 41. By this mechanism, the pointer 44 may be manually moved to mark any selected point on the scale.

The cam shown is convex upwards, but it is to be understood that this is to cause the secondary needle to register a weight in excess of the true weight. By changing the form or curvature of the cam, the secondary needle may be made to register a weight below the true weight. Various changes in the relationship and form are contemplated to secure secondary registration in excess of or below the true weight according to the use to which the device is to be put.

In operation for pickling hams a ham is placed on the pan, and as shown, may register a true weight of 13 lbs. If its weight is to be increased by 12%, it must eventually weigh 14 lbs. and 11 oz. The cam 22 is set so that pointer 32 indicates "12" on the dial 33. Then the secondary needle 18 registers 14 lbs. and 11 oz. To avoid reading and remembering this indication of weight, the manual pointer 44 is turned to this mark. Then a pickle-needle 50, if not already inserted and tared for weight, is inserted into the ham in any well known manner so as not to interfere with the weight registered. Pickle is pumped into the ham by operation of a valve (not shown) in the hose 51 to the needle. As the weight of the added pickle is added to the ham, both needles rise in the scale. This is continued until the true-weight needle 13 reaches the manual pointer 44. Then the valve to the pickle-line is closed, and the ham removed, containing 12% pickle.

The invention above described and illustrated in one particular embodiment may be modified and varied in a variety of ways without departing from the scope of the invention as expressed in the appended claims.

The present application is specific to my copending application serial No. 197,057, filed March 21, 1938, containing claims generic to the construction herein claimed specifically.

I claim:

1. In a weighing device having a fixed scale marked to indicate weights and a weight-needle movable to register a weight on said scale, the combination of a secondary needle pivoted on the weight needle to move over said scale, an arm carried by the secondary needle to present a cam-riding portion, and a cam presented to said arm, the shape of the cam being such as to cause the secondary needle to turn on its pivot relatively to the weight-needle to indicate a constant ratio between the weights registered by the two needles.

2. In a weighing device having a fixed scale marked to indicate weights and a weight-needle movable to register a weight on said scale, the combination of a secondary needle pivoted on the weight needle to move over said scale, an arm carried by the secondary needle to present a cam-riding portion, and a cam presented to said arm, the shape of the cam being such as to cause the secondary needle to turn on its pivot relatively to the weight-needle to indicate a constant ratio between the weights registered by the two needles, and means to shift the position of the cam to set it for different ratios between the weights.

3. In a weighing device having a fixed scale marked to indicate weights and a weight-needle movable to register a weight on said scale, the combination of a secondary needle pivoted on the weight needle to move over said scale, an arm carried by the secondary needle to present a cam-riding portion and a cam presented to said arm, the shape of the cam being such as to cause the secondary needle to turn on its pivot relatively to the weight-needle to indicate a constant ratio between the weights registered by the two needles, and a pointer adapted to be moved manually over the scale to mark a selected position of any one of the needles.

4. In a weighing device having a fixed scale marked to indicate weights and a weight-needle movable to register a weight on said scale, the combination of a secondary needle pivoted on the weight needle to move over said scale, an arm carried by the secondary needle to present a cam-riding portion, and a cam presented to said arm, the shape of the cam being such as to cause the secondary needle to turn on its pivot relatively to the weight-needle to indicate a constant weight in excess of that indicated by the weight-needle by a constant ratio.

5. In a weighing device, two movable indicating means, one of said means being connected to the weight responsive mechanism of the weighing device to indicate the weight, means connecting the two indicating means for motion together, and a cam operable upon said connecting means to predetermine a difference in registrations by the registration of one of them, said cam being designed to give the registrations a predetermined ratio.

6. In a weighing device, two movable indicating means, one of said means being adapted for actuation by the weight of an article to indicate the weight, means connecting the two indicating means for motion together, a determinant device to control said connecting means to predetermine a difference in registrations by the registration of one of them, and a manual indicating means arranged to indicate registration of one of said connected indicating means to serve as a goal for the other.

7. In a weighing device, an indicating means operable by the weight of an article effective thereon to indicate the weight, a second indicating means, a connection between said two means whereby they move together, means operable on the connection to maintain a given ratio between the indications of the connected indicating means, and a manually operable indicating means movable to coincide with any registration of the connected indicating means, whereby when the weight of an article causes registration of its weight and a ratio weight thereof, the manual means may be set to coincide with the ratio-weight-indicating means to establish a goal for the weight-operated and weight-indicating means in changing the weight of the article.

8. In a weighing device, two movable indicating means, one of said means being connected to the weight responsive mechanism of the weighing device to indicate the weight, means connecting the two indicating means for motion together, a cam operable upon said connecting means to predetermine a difference in registrations by the registration of one of them, said cam being designed to give the registrations a predetermined ratio, and a third indicating means manually movable and adapted to maintain a given position in coincidence with one of said two movable indicating means, whereby when an article being weighed registers two indications one of which has a given ratio to the other, the manual means may be set to indicate the ratio-weight to serve as a goal for the true-weight indicating means in changing the weight of the article.

W. BARTLETT JONES.